US012134053B2

(12) United States Patent
Shim et al.

(10) Patent No.: US 12,134,053 B2
(45) Date of Patent: Nov. 5, 2024

(54) FILTRATION MEDIA ESPECIALLY USEFUL FOR FILTERING FLUIDS ASSOCIATED WITH WIRE ELECTRON DISCHARGE MACHINING (WEDM) PROCESSES

(71) Applicant: Ahlstrom Oyj, Helsinki (FI)

(72) Inventors: Jesse Shim, Daegu Metropolitan (KR); Melissa Kang, Daegu Metropolitan (KR); Jun Kim, Shanghai (CN); Xiling Zeng, Shanghai (CN); Kauter Liu, Binzhou (CN)

(73) Assignee: Ahlstrom Oyj, Espoo (FI)

( * ) Notice: Subject to any disclaimer, the term of this patent is extended or adjusted under 35 U.S.C. 154(b) by 1020 days.

(21) Appl. No.: 17/048,253

(22) PCT Filed: Apr. 16, 2019

(86) PCT No.: PCT/FI2019/050308
§ 371 (c)(1),
(2) Date: Oct. 16, 2020

(87) PCT Pub. No.: WO2019/202213
PCT Pub. Date: Oct. 24, 2019

(65) Prior Publication Data
US 2021/0154607 A1 May 27, 2021

Related U.S. Application Data

(60) Provisional application No. 62/658,384, filed on Apr. 16, 2018.

(51) Int. Cl.
*B01D 39/18* (2006.01)
*B01D 39/16* (2006.01)
*B23H 1/10* (2006.01)

(52) U.S. Cl.
CPC ........... *B01D 39/18* (2013.01); *B01D 39/163* (2013.01); *B23H 1/10* (2013.01); *B01D 2221/14* (2013.01);
(Continued)

(58) Field of Classification Search
CPC .. B01D 39/18; B01D 39/163; B01D 2221/14; B01D 2239/0216; B01D 2239/1225;
(Continued)

(56) References Cited

U.S. PATENT DOCUMENTS 5,288,402 A 2/1994 Yoshida
8,662,316 B2 3/2014 Sakadume et al.
(Continued)

FOREIGN PATENT DOCUMENTS

CN 102444054 A 5/2012
CN 104582812 A 4/2015
(Continued)

OTHER PUBLICATIONS

Burrow, Recent Advances In Chemically Treated Lyocell Fibres, 2005, pp. 110-115 (Year: 2005).*
(Continued)

*Primary Examiner* — Clare M Perrin
(74) *Attorney, Agent, or Firm* — Sisson & Banyas, Attorneys at Law, LLC; Jeffrey J. Banyas (57) ABSTRACT

Fibrous filtration media and methods of making and using the same are provided whereby the media includes a wet-laid nonwoven fibrous web having from about 20 wt. % to about 80 wt. %, based on total weight of fibrous web, of bicomponent staple fibers, and from about 10 wt. % to about 50 wt. %, based on total weight of the fibrous web, of fibrillated lyocell staple fibers. The fibrous web exhibits a wet burst strength of greater than 3 bar, for example between about 3 bar to about 6 bar and is especially suitable for use in filtering process fluids (e.g., water) associated with wire electron discharge machining (WEDM).

18 Claims, 2 Drawing Sheets

(52) U.S. Cl.
CPC ........... *B01D 2239/0216* (2013.01); *B01D 2239/1225* (2013.01); *B01D 2239/1233* (2013.01); *B01D 2239/1291* (2013.01)

(58) Field of Classification Search
CPC .... B01D 2239/1233; B01D 2239/1291; B01D 2239/0407; B01D 2239/0457; B23H 1/10
See application file for complete search history.

(56) References Cited

U.S. PATENT DOCUMENTS

| | | | |
|---|---|---|---|
| 2015/0107208 A1* | 4/2015 | Battenfeld | B01D 39/163 55/528 |
| 2016/0023146 A1 | 1/2016 | Hampton et al. | |
| 2016/0250575 A1* | 9/2016 | Park | B32B 9/045 55/486 |
| 2017/0296953 A1 | 10/2017 | Parker | |

FOREIGN PATENT DOCUMENTS

| | | |
|---|---|---|
| CN | 105828903 A | 8/2016 |
| JP | H11165009 A | 6/1999 |
| JP | 2000070628 A | 3/2000 |
| JP | 2001-300225 A | 10/2001 |
| JP | 2002085918 A | 3/2002 |
| JP | 2003038918 A | 2/2003 |
| JP | 2004-188409 A | 7/2004 |
| JP | 2012-223662 A | 11/2012 |
| JP | 2012-223663 A | 11/2012 |
| KR | 10-0946979 B1 | 3/2010 |
| WO | 2006008828 A1 | 1/2006 |
| WO | 2014/164127 A1 | 10/2014 |

OTHER PUBLICATIONS

Hiroshige Mokudai, Translation of Office Action for Japanese Patent Application 2020-556917, Feb. 13, 2023.

* cited by examiner

FIG. 1 (Invention)

FIG. 2 (Comparative Example 1)

FILTRATION MEDIA ESPECIALLY USEFUL FOR FILTERING FLUIDS ASSOCIATED WITH WIRE ELECTRON DISCHARGE MACHINING (WEDM) PROCESSES

PRIORITIES AND CROSS REFERENCES

This Application claims priority from International Application No. PCT/FI2019/050308 filed on 16 Apr. 2019, and U.S. Provisional Application No. 62/658,384 filed on 16 Apr. 2018, the teachings of each of which are incorporated by reference herein in their entirety.

FIELD

The embodiments disclosed herein relate generally to fibrous filtration mats or webs for filtering process fluids. In particular, the embodiments disclosed herein relate to fibrous filtration media which includes a fibrous web comprising sheath-core type bicomponent fibers and fibrillated binder fibers (e.g., fibrillated lyocell microfibers), the fibrous web having a wet burst strength of 3 bar or greater. The fibrous filtration media as disclosed herein is especially useful for filtering process fluids (e.g., water) associated with wire electron discharge machining (WEDM) processes.

BACKGROUND

Electrical Discharge Machining (EDM) is a controlled process used to shape electrically conductive materials, typically hard metals, by using electrical discharges. EDM is used to make fixtures, dies, molds, production parts and other prototypes that can especially be used in aerospace, automotive and electronics industries. EDM is typically used for complex shapes or small work pieces, which cannot be made with conventional cutting tools. Material is removed from the workpiece by a series of recurring current discharges between two electrodes, separated by a dielectric fluid. An electric spark is used as the cutting tool to cut (erode) the workpiece to produce the finished part with the desired shape.

Industrial EDM machines are of 3 different types: Die-sinking EDM, wire-cut EDM (WEDM) and hole-drilling EDM. Die-sinking EDM consists of an electrode and a workpiece which is submerged in an insulating fluid such as oil or other dielectric fluids. Wire-cut EDM (WEDM) is mostly used when low residual stresses are required, as it does not use high cutting forces for removal of material. WEDM typically uses deionized water as its dielectric fluid. Hole-drilling EDM is used for very specialized applications that require holes to be made in the metal.

The cutting process used in WEDM machines erodes material from the workpiece and the wire electrode, leading to small particle debris in the dielectric fluid (deionized water). Filtration systems are used to remove the solid contaminants from the deionized water before it is recirculated back into the spark gap, the space between the electrode wire and the workpiece. Effective filtration is essential to maintain cutting speed, prevent wear and tear of the machine and to ensure the dimensional accuracy of the final product.

The filter media for WEDM needs to be restricted to a high wet burst strength of between 3-6 bar. The WEDM filter media are replaced when wet at a differential pressure (DP) over 2.5 bar, typically 3 bar. Hence, the media must have minimum burst strength of 3 bar. As a safety requirement for WEDM machines, the media should burst once the pressure differential exceeds 6 bar. Hence the maximum burst strength of the media should be restricted to 6 bar.

Typically, most electron discharge machining (EDM) filter media are saturated with phenolic or acrylic resins in order to meet the minimum burst strength requirement of 3 bars. For example, U.S. Pat. No. 8,662,316 discloses a wet-laid EDM filter media made with glass and cellulosic pulp, where a synthetic resin binder is applied in the amount of 5-20 wt % to increase the media's burst strength. Japanese patent application 2002085918 discloses a similar media made with glass fiber and cellulosic pulp saturated with up to 20 wt % binder resin. Chinese patent application 102444054 describes a wet-laid media made with combination of glass, polyester and wood pulp, saturated with a phenolic resin. U.S. Pat. No. 5,288,402 discloses a two layer media where an acrylic resin is used to saturate both the layers. South Korea Patent No. 10-0946979 discloses a two layer laminated media, where a polymer melt-blown layer is bonded to the spunbond nonwoven by using hot melt binder resin. Japanese patent application 2003038918 describes a two-layer liquid filtration media with resin binder applied to one of the layers. (Each of the patent publications cited above are expressly incorporated by reference herein.)

However, the binder resins used in the traditional EDM filter media tend to fill the pores of the media, resulting in less area for particle capture and thereby a shorter filter life. Additionally, the resin saturated media contain ionic materials, which can be released as dissolved contaminants in the deionized water. High release of ionic materials shortens the life time of ion exchange resin in the EDM system, which regulates the conductivity of the deionized water. Since ionic materials increase the conductivity of the deionized water, this could lead to disturbances in the electrical discharge and imprecise machining.

It would therefore be highly desirable if a binder resin free fibrous filtration medium was provided that could be satisfactorily employed to filter WEDM process fluids having a burst strength within a range of between about 3 bar to about 6 bar. It is therefore towards fulfilling such desirable attributes that the embodiments disclosed herein are directed.

SUMMARY OF EXEMPLARY EMBODIMENTS

The embodiments disclosed herein are related to fibrous filtration media that are especially useful for filtration of WEDM process fluids. Preferred forms of the fibrous filtration media are usefully employed to filter process fluids associated with electron discharge machining (EDM), specifically wire electron discharge machining (WEDM) and include a fibrous web comprising from about 20 wt. % to about 80 wt. %, based on the total weight of the fibrous web, of bicomponent binder fibers, preferably of a sheath-core type bicomponent fibers serving as binder fibers, and between about 10 wt. % to about 50 wt. % fibrillated lyocell staple fibers, for example lyocell microfibers.

The fibrillated lyocell microfibers employed in the embodiments disclosed herein will be sufficiently fibrillated so as to exhibit a Canadian Standard Freeness (CSF) of about 100 mL or less. Preferably, the fibrillated lyocell fibers contain less than 10% by weight of lyocell fibers that are longer than 1.0 mm. The fibrous web of the embodiments disclosed herein may be produced using a standard wet-laid process and subsequently subjecting the wet laid media to hot calender treatment so as to substantially (preferably completely) cause the lower melting polymeric sheath component of the bicomponent fibers to melt thereby binding the remaining core of the bicomponent fibers to the other fibers in the media.

The combined use of bicomponent binder fibers and fibrillated lyocell staple fibers, such a lyocell microfibers, in the specified proportions described hereinafter, results in a fibrous web with high wet burst strength of 3 bar or greater without necessarily adding additional binder resins to the media. The bicomponent binder fibers impart a very high burst strength to the media without compromising the media porosity since the fiber core retains its shape in the media even after hot calendering. Interestingly, the fibrillated lyocell microfibers also function as binder fibers due to the mechanical interlocking (as seen in the SEM images of the inventive media) of the lyocell fibrils with other fibrils and/or other fibrous components of the media when homogeneously mixed and distributed throughout the media. Such mechanical interlocking of adjacent fibers will thereby find such adjacent fibers to one another contributing to higher wet burst strength in the absence of additional binder resin. Lyocell is a hydrophilic material which is capable of retaining good wet strength (e.g., lyocell media maintains 70-90% of dry burst strength in wet conditions as compared to cellulose media which only retains 10-20% of dry burst strength in wet conditions). As such, these properties of the fibrous filtration media according to the embodiments disclosed herein are desirable for water treatment filters, especially water treatment filters for EDM.

The fibrous webs according to the embodiments disclosed herein exhibit a larger number of pores, smaller pore size and higher void ratio as compared to the prior art. Thus the fibrous web according to the embodiments disclosed herein advantageously possesses a high particle filtration efficiency of >95% for 5 µm particles and a longer service life as compared to conventional EDM filter media. The fibrous web of the embodiments disclosed herein also exhibit very low release of ionic materials, and hence can be used to make liquid treatment filters which are sensitive to chemicals These and other attributes of the various embodiments according to the invention will be better understood by reference to the following detailed descriptions thereof.

DEFINITIONS

As used herein and in the accompanying claims, the terms below are intended to have the definitions as follows.

"Fiber" is a fibrous or filamentary structure having a high aspect ratio of length to diameter.

"Staple fiber" means a fiber which naturally possesses or has been cut or further processed to definite, relatively short, segments or individual lengths.

"Fibrous" means a material that is composed predominantly of fiber and/or staple fiber.

The terms "non-woven" or "web" mean a collection of fibers and/or staple fibers in a web or mat which are randomly interlocked, entangled and/or bound to one another so as to form a self-supporting structural element.

The terms "synthetic fiber" and/or "man-made fiber" refer to fibers made from fiber-forming substances including polymers synthesized from chemical compounds, modified or transformed natural polymer and siliceous (glass) materials. Such fibers may be produced by conventional melt-spinning, solution-spinning, solvent-spinning and like filament production techniques.

A "cellulosic fiber" is a fiber composed of or derived from cellulose.

"Freeness" is the measure, in mL, of the rate in which a dilute suspension of staple fibers (i.e., 3 g of staple fibers in 1 L of water) may be drained, as described in the Technical Association of Pulp and Paper Industry (TAPPI) Canadian standard method T 227 om-94 (1994) (usually referred to herein as "Canadian Standard Freeness" or "CSF"), the entire content of which is expressly incorporated hereinto by reference.

"Fibrils" are tiny, minute irregular threadlike elements associated with a staple fiber.

"Fibrillated" or means staple fibers that inherently possess or have been further acted upon to form numerous fibrils. The amount of fibrillation to achieve fibrillated fibers can be determined by the freeness of a dilute suspension of such fibers. By way of example, the fibrillated lyocell microfibers as used in the embodiments disclosed herein will therefore be sufficiently fibrillated so as to exhibit a Canadian Standard Freeness (CSF) of about 100 mL or less, preferably about 90 mL or less, typically between about 20 to about 80 mL. Advantageously, the fibrillated lyocell staple fibers will exhibit CSF of about 65 mL (+/−5 mL). The preferred lyocell staple fibers will contain less than 10% by weight, preferably less than 8% by weight, of lyocell staple fibers that are longer than 1.0 mm.

The term "thermoplastic" means a plastic which becomes pliable or moldable above a specific temperature and returns to a solid state upon cooling. Exemplary thermoplastic fibers suitable for the present embodiments include polyesters (e.g., polyalkylene terephthalates such as polyethylene terephthalate (PET), polybutylene terephthalate (PBT) and the like), polyalkylenes (e.g., polyethylenes, polypropylenes and the like), polyacrylonitriles (PAN), and polyamides (nylons, for example, nylon-6, nylon 6,6, nylon-6,12, and the like). Preferred are PET fibers which exhibit good chemical and thermal resistance which are properties of importance for the use of the media as oil filters.

The term "siliceous" fibers primarily means "glass" fibers, such as glass microfibers. Such fibers are typically staple fibers and generally have an aspect ratio (ratio of length to diameter) of between about 200 to about 1000 or more. Preferred glass microfibers will thus have an average diameter from about 0.1 µm to about 5 µm (typically from about 0.4 µm to about 2.6 µm), and an average length from 20 µm to about 5 mm. Mixtures of different diameters of glass microfibers, e.g., relatively larger glass microfibers with an average diameter of about 2.5 µm±about 0.1 µm with relatively smaller glass microfibers with an average diameter of about 0.5 µm±about 0.1 µm may be employed.

The maximum pore size, minimum pore size and mean flow pore size are measured using a technique known as capillary flow porometry. A sample of the nonwoven fibrous web sample is first wetted with a wetting fluid such that all the pores in the sample are filled. A nonreacting gas of increasing pressure is applied to one side of the wet sample to displace the wetting fluid from the pores. The gas pressure and gas flow rate downstream of the sample are measured and plotted for the wet sample. After the sample is dry, the test is repeated to plot a similar curve for the dry sample. The "maximum pore size" is calculated from the bubble point, i.e., the gas pressure at which air flow through the wet sample is first detected. The term "mean flow pore size" is calculated from the gas pressure at which the flow through a wetted sample is 50% of the flow through the dry sample. The term "minimum pore size" is calculated from the pressure at which the wet flow rate curve merges with dry flow rate curve. The term "pore size range" is defined as the difference between the "maximum pore size" and the "minimum pore size" (i.e. Pore Size Range=Maximum Pore Size−Minimum Pore Size).

DETAILED DESCRIPTION

The fibrous filtration media in the embodiments disclosed herein will comprise a nonwoven fibrous web comprising a homogenous wet-laid mixture of bicomponent staple binder fibers in an amount of about 20 wt. % to about 80 wt. % and fibrillated lyocell fibers in an amount of about 10 wt. % to about 50 wt. %, each being based on total weight of the fibrous web, in a homogenous wet-laid mixture. Certain preferred embodiments of the fibrous web will have a weight ratio of the weight of bicomponent staple fibers/weight of fibrillated lyocell fibers within a range of between 0.5 to 3.

According to certain embodiments, the fibrous web of the filtration media will be essentially free of binder resin. "Essentially free" means that some deminimis amount of binder resin may be present which does not affect the filtration properties of the media, for example, 0-3 wt. %, based on the total weight of the fibrous web. In especially preferred embodiments, the filtration media is completely free of binder resin, i.e., the media contains no (0 wt. %) of binder resin.

A. Bicomponent Staple Binder Fibers

The fibrous web employed in the filtration media of the embodiments disclosed herein comprises a synthetic bicomponent staple fiber that serves as a binder fiber. Preferably, the bicomponent staple fibers are sheath-core bicomponent staple fibers. As is known per se, the bicomponent staple fibers will have been formed by extruding polymer sources from separate extruders and spun together to form a single fiber, e.g., in a sheath-core arrangement. Typically, two separate polymers are extruded, although a bicomponent fiber may encompass extrusion of the same polymeric material from separate extruders with the polymeric material in each extruder having somewhat different properties (e.g., melting points). The extruded polymers are arranged in substantially constantly positioned distinct zones across the cross-section of the bicomponent fibers and extend substantially continuously along the length of the bicomponent fibers. The configuration of bicomponent fibers employed in the practice of the embodiments disclosed herein are preferably substantially symmetric sheath-core bicomponent fibers whereby the polymeric sheath completely surrounds and envelops the polymeric core at an area ratio of sheath to core of between about 25/75 to about 75/25, typically about between about 50/50 to about 70/30.

The bicomponent staple fibers are preferably bicomponent polyethylene terephthalate (PET) staple fibers having a lower melting point PET sheath surrounding a higher melting point PET core. In preferred forms, the bicomponent PET staple fibers will include a PET sheath having a melting point of between about 120° C. to about 180° C., typically between about 150° C. to about 180° C., e.g., about 165° C. (+/−3° C.), and a PET core having a melting point that is at least about 50° C., typically at least about 75° C., e.g., about 100° C. (+/−5° C.) greater than the melting point of the PET sheath. The PET core of the bicomponent staple fibers may therefore have a melting point of between about 220° C. to about 280° C., typically between about 250° C. to about 270° C., e.g., about 260° C. (+/−5° C.).

The core portion of the bicomponent fiber may be comprised of thermoplastic polymeric material. Exemplary core material therefore include polyalkylenes (e.g., polyethylenes, polypropylenes and the like) and polyesters (e.g., polyalkylene terephthalates such as polyethylene terephthalate (PET), polybutylene terephthalate (PBT) and the like). On the other hand, the sheath portion of the bicomponent fiber may also be comprised of other thermoplastic polymeric materials, for example polyalkylenes (e.g., polyethylenes, polypropylenes and the like) and polyamides (nylons, for example, nylon-6, nylon 6,6, nylon-6,12, and the like). One preferred bicomponent staple fiber employed in the practice of the embodiments disclosed herein is LMF50 bicomponent staple fibers commercially available from Huvis Corporation having a denier of about 4 and a length of about 6 mm.

The bicomponent staple fibers will be present in the filtration media in an amount of 20 wt. % to about 80 wt. %, for example between about 25 wt. % to about 35 wt. %, or even about 30 wt. % (+/−0.5 wt. %), based on the total weight of the fibrous web.

B. Fibrillated Lyocell Fibers

As briefly noted previously, the fibrillated lyocell staple fibers will be employed in the fibrous web in an amount of about 10 wt. % to about 50 wt. %, typically an amount of 12 wt. % to about 45 wt. %, for example about 25 wt. % (+/−3 wt. %), based on total weight of the fibrous web. The fibrillated lyocell fibers will be present in an amount sufficient so that the fibrous web has a weight ratio of the weight of bicomponent staple fibers/weight of fibrillated lyocell fibers within a range of between 0.5 to 3.

The fibrillated lyocell staple fibers are most preferably nanofibers, that is staple fibers having an average diameter of about 1000 nanometers or less, or sometimes about 400 nanometers or less, for example about 100 nanometers. Some especially preferred embodiments will include fibrillated cellulosic staple fibers of about 250 nanometers. The lyocell staple fibers employed in the embodiments disclosed herein will typically have a length of greater than about 0.4 mm. Preferably the lyocell staple fibers will comprise less than 10%, for example less than 8%, of lyocell fibers having a length of less than 1 mm.

Preferably, the lyocell staple fibers are highly fibrillated. Specifically, the lyocell staple fibers may be fibrillated to such an extent as to possess a Canadian Standard Freeness (CSF) of about 100 mL or less, preferably about 90 mL or less, for example between about 20 mL to about 80 mL. Advantageously, the fibrillated lyocell staple fibers will exhibit a CSF of about 65 mL (+/−5 mL).

C. Optional Fibrous Components

The fibrous web and/or filtration media may comprise one or more other synthetic fibrous component in addition to the bicomponent and fibrillated lyocell staple fibers as discussed above. The additional fibrous components may, for example, be synthetic staple fibers formed of a thermoplastic polymeric material. Exemplary thermoplastic staple fibers that may be employed therefore include polyesters (e.g., polyalkylene terephthalates such as polyethylene terephthalate (PET), polybutylene terephthalate (PBT) and the like), polyalkylenes (e.g., polyethylenes, polypropylenes and the like), polyacrylonitriles (PAN), and polyamides (nylons, for example, nylon-6, nylon 6,6, nylon-6,12, and the like). Preferred are PET fibers which exhibit good chemical and thermal resistance suitable for filtration end use applications.

Glass microfibers may also optionally be present, e.g., in admixture with the other synthetic fibers as previously described, in amounts sufficient to improve efficiency of the fibrous media as a filter. Typically, the glass microfibers, if present, will be employed in amounts of up to about 40 wt. %, typically up to about 22 wt. %, based on total weight of the fibrous web. Glass microfibers having an average fiber diameter of between about 0.2 µm to about 5 µm, typically between about 0.5 µm to about 2.5 µm±about 0.1 µm, may be employed. Preferred glass microfibers for the fibrous media of the embodiments described herein may be commercially obtained as C04 glass fibers (average fiber diameter of 0.5 µm), C06 glass fibers (average fiber diameter of 0.65 µm) and C26 glass fibers (average fiber diameter of 2.6 µm) from Lauscha Fiber International of Summerville, SC.

Other non-fibrillated cellulosic staple fibers may optionally be blended with the fibrous components so as to impart additional stiffness to the filtration media. According to some embodiments, therefore, the addition of from 0 up to about 40 wt. %, for example, from 0 wt. % to about 30 wt. % or to about 25 wt. %, based on total fiber weight of the media, of non-fibrillated lyocell staple fibers may be employed.

In certain preferred forms, the nonwoven fibrous web may comprise a mixture of differently sized synthetic fibers. In this regard, the media may comprise a mixture of between about 0 wt. % to about 60 wt. %, based on total weight of the fibrous web, of at least one type of synthetic polymeric fibers having an average diameter of between about 2.5 µm to about 10 µm, and between about 0 wt. % to about 60 wt. %, based on total weight of the fibrous web, of a second type of synthetic polymer fibers having an average diameter of between about 10 µm to about 20 µm. The first type of synthetic fibers may have an average length of between about 1 mm to about 6 mm, while the second type of synthetic fibers may have an average length of between about 5 mm to about 25 mm.

D. Optional Components

Additives conventionally employed in wet-laid filtration media, such as for example, wet strength additives, optical brighteners, fiber retention agents, colorants, separation aides (e.g., silicone additives and associated catalyzers), fire or flame retardants (e.g., in the form of particulates or fibers) and the like may also be employed in the filtration media and/or fibrous web thereof. If present, these additives may be included in amounts of 0 wt. % up to about 25 wt. %, preferably up to about 20 wt. %, for example between about 0.1 wt. % to about 20 wt. %, based on total weight of the fibrous web.

E. Methods of Making

The fibrous web described herein may be made by any conventional "wet-laid" paper-making technology. Thus, for example, predetermined amounts of the bicomponent staple fiber, the fibrillated lyocell fibers and optionally any other fibrous or non-fibrous component may be mixed with water and placed in a pulper or beater. The fibers and optional other components are mixed and dispersed by the pulper or beater evenly in the water to form a slurry batch. Some mechanical work can also be performed on the fibers to affect physical parameters, such as permeability, surface properties and fiber structure. The slurry batch may thereafter be transferred to a mixing chest where additional water is added and the fibers are homogenously blended. The blended slurry may then be transferred to a machine chest where one or more slurry batches can be combined, allowing for a transfer from a batch to a continuous process. Slurry consistency is defined and maintained by agitation to assure even dispersion of fibers. In this regard, the slurry may optionally be passed through a refiner to adjust physical parameters.

The slurry is then transferred to a moving wire screen where water is removed by means of gravity and suction. As water is removed, the fibers in the wet-laid mat form into a fibrous nonwoven web or sheet having characteristics determined by a number of process variables, including for example, the slurry flow rate, machine speed, and drainage parameters. The formed sheet may optionally be compressed while still wet so as to compact the media and/or modify its surface characteristics. The wet fibrous web is then moved through a drying section comprised of heated rollers (or "cans" in art parlance) where most of the remaining entrained water is removed.

The dried fibrous web may then be taken up on a roll for further processing into finished sheet or passed directly to a calendering section comprised of at least one pair, sometimes a series of two pairs, of opposed calendering rolls. The calendering rolls operate so as to press (consolidate) the mass of nonwoven wet-laid fibers in the base sheet to form the fibrous web as disclosed herein. In preferred forms, the calendering rolls will operate so as to press the nonwoven fibrous web at calendering pressures of about 1 kN/m to about 150 kN/m and calendering temperatures of 110° C. to about 250° C. sufficient to allow the sheath of the bicomponent staple fiber component to melt and form a bond with the other synthetic fiber components in the nonwoven fibrous web. Calendering machine line speed can be selected to be between about 1 m/min to about 50 m/min. Such calendering machine line speeds and elevated temperatures/ pressures as herein described results in hot area-calendering of the fibrous web.

The calendering rolls do not point bond the nonwoven fibrous web. Instead, the calendering rolls impart substantially uniform pressure and temperature across the entire surface area of the web in the manner described hereinabove so as to evenly calender the web (i.e., area-calendering). Such hot area-calendering thereby causes a substantial (if not the entire) part of the lower melting sheath polymer of the bicomponent staple fibers in the nonwoven web to melt and thereby bond the remaining thermoplastic core component of the bicomponent staple fibers with one another and with the other fibrous components in the web.

The resulting fibrous web may be employed as is or may be plied with additional fibrous media, for example preformed fibrous layers or a web formed of multiple layers in the wet-laid process. When the multiple fibrous web layers provide the filtration media, then the hot area-calendered fibrous web layer of the embodiments disclosed herein is preferably positioned so as to be the outmost layer of the filtration media.

F. Media Properties

The resulting area-calendered fibrous web will exhibit a wet burst strength of equal to or greater than 3 bar and no more than about 6 bar.

The density of the fibrous web will typically be more than about 0.15 g/cm$^3$, for example more than about 0.25 g/cm$^3$.

The pore size range of the fibrous web will be 20 µm or less, typically, 15 µm or less, with the mean flow pore size being 20 µm or less, typically 15 µm or less, for example 14 µm or less and the maximum pore size being 25 µm or less, typically 20 µm or less, for example, 19 µm or less.

The present invention will be further illustrated by the following non-limiting examples thereof.

(I) TEST METHODS

The following test methods were employed to obtain the data reported in the Table below.

Pore Size: Pore size (μm) was determined by the American Society of Testing and Materials (ASTM) Standard 316-03 (2011) (incorporated fully by reference herein). The minimum, maximum and mean flow pore sizes, and the number of pores of the media examples below were tested with Porometer 3G produced by Quantachrome Instruments (1900 Corporate Drive Boynton Beach, FL 33426 USA) with the reported pore size and pore number data being an average of two samples, one tested on each side of the media. (i.e. wire side and felt side in the case of wet-laid media).

The pore size and pore number data are measured using a technique known as capillary flow porometry. The sample is first wetted with a wetting fluid such that all the pores in the sample are filled. A nonreacting gas of increasing pressure is applied to one side of the wet sample to displace the liquid from the pores. The gas pressure and gas flowrate downstream of the sample are measured and plotted for the wet sample. After the sample is dry, the test is repeated to plot a gas flow vs. the applied pressure curve for the dry sample. Using such capillary porometry technique, the "maximum pore size", "minimum pore size" and "mean flow pore size" can be determined.

Maximum Pore Size: The gas pressure using the capillary flow porometry technique described hereinabove at which air flow through the media is first detected (i.e. the pressure at which the bubbles first begin to flow) is used to calculate the maximum pore size.

Minimum Pore Size is determined from the pressure at which the wet flow rate curve merges with dry curve using the capillary flow porometry technique described hereinabove.

Mean Flow Pore Size is the pore diameter at which the flow through a wetted medium is 50% of the flow through the dry medium at the same pressure drop using the capillary flow porometry technique described hereinabove.

Pore Size Range is defined as the difference between the Maximum Pore Size and the Minimum Pore Size (i.e. Pore Size Range=Maximum Pore Size−Minimum Pore Size).

Caliper: The caliper (thickness) of the media was measured according to the International Organization for Standardization (ISO) Standard ISO 534(2011), "Paper and board-Determination of thickness, density and specific volume" (incorporated fully by reference herein).

Air Permeability: Air Permeability of the media was measured at 125 Pa water pressure differential, according ASTM Standard D737: Standard Test Method for Air Permeability of Textile Fabrics (incorporated fully by reference herein). The air flow through the media is reported in cubic foot per minute per square foot of sample (cfm/sf or cfm).

Burst Strength: The pressure required to rupture a media sample when either dry ("dry burst strength") or wet ("wet burst strength") was measured according to ISO Standard 2758 (2014), "Paper-Determination of bursting strength" (incorporated fully by reference herein). Results are reported in kilogram force per square meter at media rupture and then converted into bar.

Filtration Efficiency and Apparent Capacity: Filtration Efficiency and Apparent Capacity are measured according to International Organization for Standardization (ISO) Standard ISO 19438(2003), "Diesel fuel and petrol filters for internal combustion engines—Filtration efficiency using particle counting and contaminant retention capacity". The filter media samples are tested using ISO12103-1 A3 Medium test dust at the following test conditions: face velocity of 0.344 cm/sec and terminal pressure drop of 78.5 kPa.

Void Ratio: The void ratio was determined by the following procedure: A 40 mm×40 mm dry test piece of the media having an initial weight ($w_1$) was placed in a beaker with 200 cc of n-butyl alcohol and thereafter positioned in a desiccator which is evacuated until no bubbles emanating from the test piece were visibly observed. The test piece was removed from the n-butyl alcohol in the beaker and weighed immediately upon removal to obtain an initial weight ($w_2$) and the reweighed after 30 seconds of removal to obtain a final wet weight ($w_3$). The void ratio (%) was then calculated by the following formula: void ratio (%)=$(w_3-w_1)/(w_3-w_2) \times 100$.

(II) MATERIALS

The following materials were employed:

Bicomponent Staple Fibers: 4 denier, 6 mm length (4d*6 mm) staple bicomponent low melting fibers (LMF) commercially available from Huvis Corporation.

Fibrillated Staple Fibers: Mirofibrillated lyocell fibers commercially available from Interlace Corporation under the tradename INTERLACE™ were employed having an average length (LWAFL) of 1.11 mm, average fiber diameter of 20 μm and average fibril diameter of 150 nm.

Additional Fibrous Components: (1) 0.3 dtex*5 mm polyethylene terephthalate (PET) staple fibers commercially available from Teijin Ltd.; (2) 0.06 dtx*1.5 mm CYPREX™ 1001 PET microfibers commercially available from Eastman Chemical Company; (3) 1.7 dtex*4 mm TENCEL™ non-fibrillated lyocell fibers commercially available from Lenzing Group; (4) 0.8d*5 mm PET staple fibers commercially available from Toray Industries

(III) MEDIA EXAMPLES

Example 1 (Inventive Media)

A single layer media was made having the fiber composition as noted in the table below. No other wet end chemicals were used except the fibers noted in the table below. In addition, the formed media was subject to heat area-calendering in the absence of any added binder resin.

Example 1 Fibrous Components

| Fiber Type | Wt. Percent* |
|---|---|
| Teijin PET fiber 0.3 dtex*5 mm | 25 wt. % |
| Lenzing Tencel fiber 1.7 dtex*4 mm | 20 wt. % |
| Huvis PET bicomponent fiber LMF 4 denier*6 mm | 30 wt. % |
| Fibrillated Lyocell Staple fibers | 25 wt. % |

*based on total weight of fibers

Example 2 (Inventive Media)

A two-layer media was made having the fiber composition as noted in the table below (wt. % being based on total fiber weight in the media). No other wet end chemicals were used except the fibers noted in the table below. In addition, the formed media was subject to heat area-calendering in the absence of any added binder resin.

Example 2 Fibrous Components

Top Layer—25 g/m², 35.7 wt. % or total media basis weight

| Fiber Type | Wt. Percent* |
|---|---|
| Eastman PET Cyphrex 10001 0.06 dtex*1.5 mm | 30 wt. % |
| Huvis PET bicomponent fiber LMF 4 denier*6 mm | 30 wt. % |
| Fibrillated Lyocell Staple fibers | 40 wt. % |

*based on total weight of fibers in top layer

Bottom Layer—45 g/m², 64.3 wt. % or total media basis weight

| Fiber Type | Wt. Percent |
|---|---|
| Toray PET fiber 0.8 d*5 mm | 45 wt. % |
| Lenzing Tencel fiber 1.7 dtex*4 mm | 25 wt. % |
| Huvis PET bicomponent fiber LMF 4 denier*6 mm | 30 wt. % |

*based on total weight of fibers in bottom layer

Comparative Example 1

A 100% cellulose-based single layer media saturated with phenolic resin (19.5 wt. % resin based on total media weight) was produced by Ahlstrom-Munksjö of South Korea using a Fourdrinier flat wire paper machine. The media of this Comparative Example 1 is typical of known media products used for WEDM process fluid filtration.

The physical properties of the inventive media according to Examples 1 and 2 and the Comparative Example 1 are summarized in Table 1 below.

TABLE 1

| Physical properties | Unit | Ex 1 | Ex 2 | Comp Ex 1 |
|---|---|---|---|---|
| Grammage | g/m² | 74 | 73 | 155 |
| Caliper | mm | 0.28 | 0.30 | 0.42 |
| Density | g/cm³ | 0.26 | 0.24 | 0.37 |
| Air Permeability (@125 Pa) | cfm | 10.5 | 11.9 | 7.5 |
| Dry Burst Strength | Kg/cm² | 4.8 | 4.2 | 2.4 |
| Wet Burst Strength | Bar | 4.2 | 3.4 | 3.1 |
| Min Pore Size | μm | 5.7 | 4.7 | 5.6 |
| Max Pore Size | μm | 19.0 | 17.2 | 22.3 |
| Mean Flow Pore Size | μm | 14.8 | 10.2 | 15.7 |
| Number of pores | #/3.14 cm² | 3516 | 20740 | 2263 |
| Pore Size Range | μm | 13.3 | 12.5 | 16.8 |
| Void ratio | % | 79.1 | 80.8 | 72.5 |

(IV) EXPERIMENTAL RESULTS

The fibrous media of Examples 1 and 2 and the Comparative Example 1 were subject to burst strength and performance testing with the results being summarized in the tables of Experimental Results 1 and Experimental Results 2 below.

Experimental Result 1—Wet Burst Strength

| Physical properties | Unit | Example 1 | Example 2 | Comparative Example 1 |
|---|---|---|---|---|
| Wet Burst Strength | Bar | 4.2 | 3.4 | 3.1 |

Experimental Result 2—Filtration Performance

| Sample | Overall Efficiency (% at specified μm) | | | | | | | | | | |
|---|---|---|---|---|---|---|---|---|---|---|---|
| | 4 μm | 5 μm | 6 μm | 7 μm | 8 μm | 9 μm | 10 μm | 12 μm | 15 μm | 17 μm | 20 μm |
| Example 1 | 93.3 | 95.4 | 96.8 | 97.7 | 98.4 | 98.8 | 99.2 | 99.5 | 99.8 | 99.9 | 100.0 |
| Example 2 | 98.7 | 99.1 | 99.4 | 99.5 | 99.6 | 99.7 | 99.8 | 99.8 | 99.8 | 99.9 | 99.9 |
| Comparative Example 1 | 47.0 | 54.9 | 62.1 | 68.5 | 74.3 | 79.4 | 83.6 | 89.8 | 95.6 | 97.8 | 99.3 |

| Sample | Overall Efficiency (% at specified μm) | | | | | Apparent Capacity [g] | Apparent Capacity per caliper [g/mm] | LIFE TIME (MIN) |
|---|---|---|---|---|---|---|---|---|
| | 25 μm | 30 μm | 35 μm | 40 μm | 50 μm | | | |
| Example 1 | 100.0 | 100.0 | 100.0 | 100.0 | 100.0 | 0.768 | 2.74 | 0:21:00 |
| Example 2 | 99.9 | 99.8 | 100.0 | 100.0 | 100.0 | 0.435 | 1.45 | 0:12:30 |
| Comparative Example 1 | 99.8 | 99.9 | 100.0 | 100.0 | 100.0 | 0.562 | 1.34 | 0:17:00 |

The above data show that the inventive media of Examples 1 and 2 exhibit wet burst strength of more than 3 bar (but less than 6 bar), even though no other wet end chemical and binder resin were present in the media.

Figure 1:
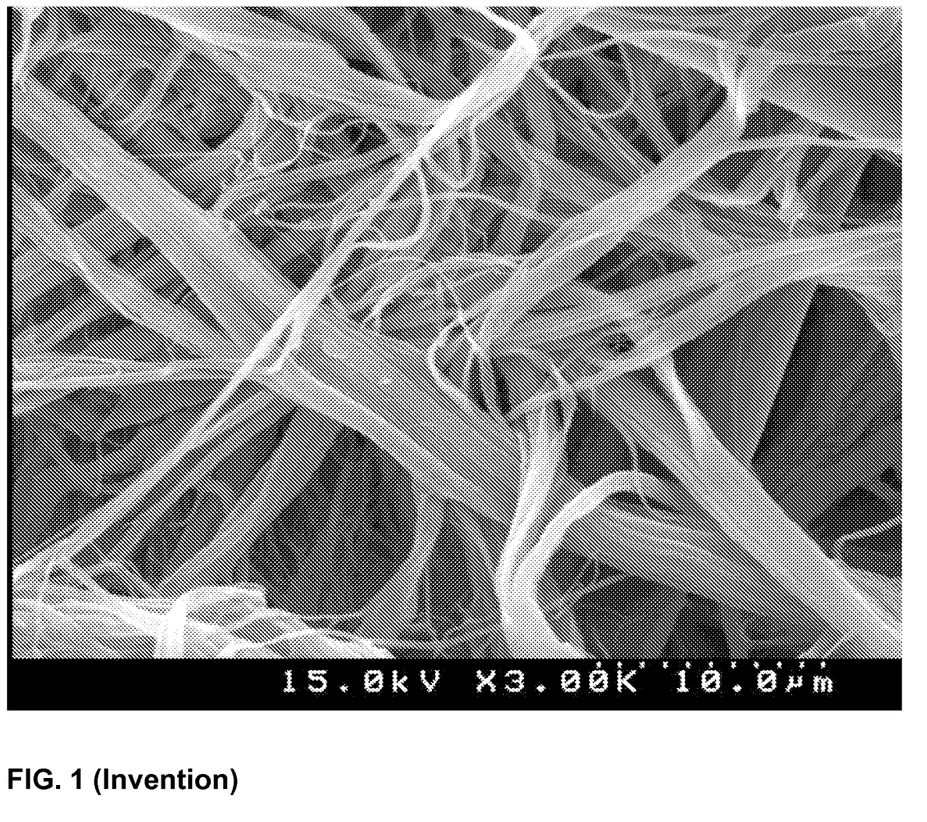
FIG. 1 is a scanning electron microscope (SEM) image of a binder-free fibrous filtration media according to the embodiment described in Example 1 hereinbelow.
Figure 2:
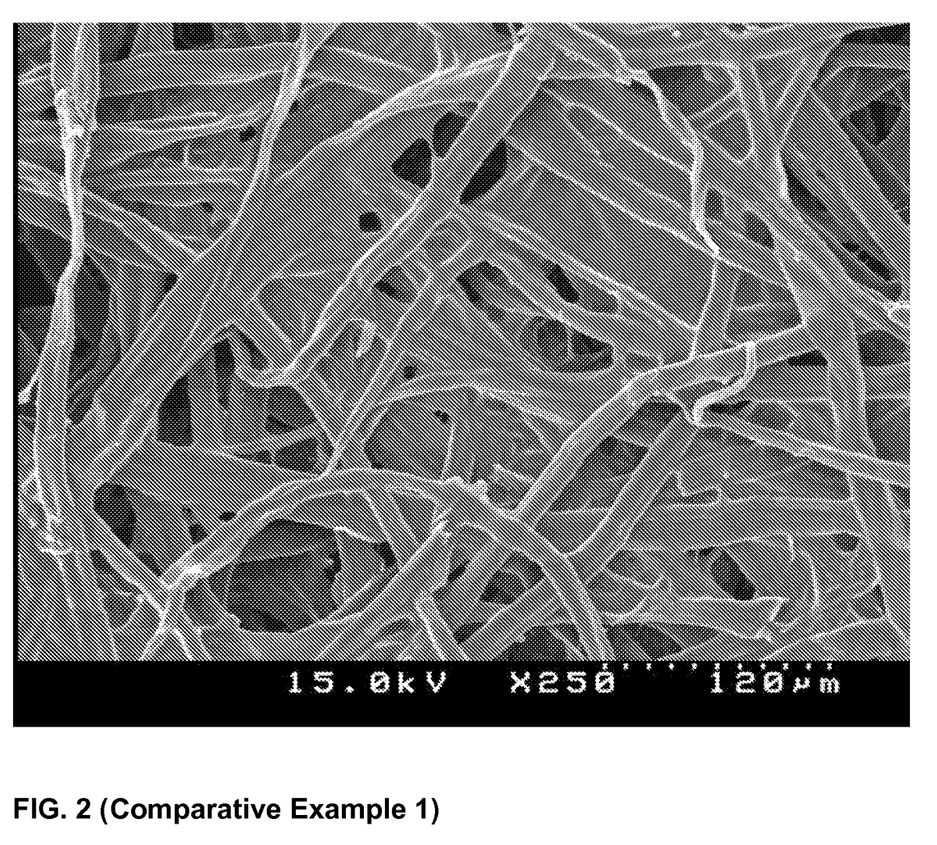
FIG. 2 is an SEM image of a comparative fibrous media containing binder resin according to Comparative Example 1 hereinbelow.

The inventive media of Example 1 (see FIG. 1) has a single layer and thus can be compared with Comparative Example 1 (see FIG. 2) which has single layer. The data show that even though the inventive media of Example 1 has much lower grammage and thinner caliper than the media of Comparative Example 1, the inventive media exhibited a much higher efficiency and longer life.

The data also show that the inventive media of Examples 1 and 2 each had an apparent capacity per caliper that was greater than that of Comparative Example 1, i.e., 2.7 and 1.5 for Examples 1 and 2 versus 1.3 for Comparative Example 1.

EMBODIMENTS

Embodiments of the invention include i.a. the following:
1, A fibrous filtration media comprising a wet-laid nonwoven fibrous web comprised of:
from about 20 wt. % to about 80 wt. %, based on total weight of the fibrous web, bicomponent staple fibers; and
from about 10 wt. % to about 50 wt. %, based on total weight of the fibers in the media, fibrillated lyocell staple fibers, wherein
the fibrous web exhibits a wet burst strength of 3 bar or greater.
1. The fibrous filtration media according to embodiment 1, wherein the fibrous web has a wet burst strength of from about 3 bar to about 6 bar.
2. The fibrous filtration media according to embodiment 1, wherein the fibrillated lyocell staple fibers have a Canadian Standard Freeness (CSF) of about 100 mL or less.
3. The fibrous filtration media according to embodiment 3, wherein the fibrous web has a mean flow pore size of 20 µm or less, preferably 15 µm or less, for example about 10 µm (+/−2 µm).
4. The fibrous filtration media according to embodiment 4, where the fibrous web has a maximum pore size of 25 µm or less, typically 20 µm or less, for example about 19 µm (+/−2 µm).
6. The fibrous filtration media according to embodiment 1, where the fibrous web comprises at least one other fiber component comprised of fibers selected from the group consisting of polyesters (e.g., polyalkylene terephthalates such as polyethylene terephthalate (PET), polybutylene terephthalate (PBT) and the like), polyalkylenes (e.g., polyethylenes, polypropylenes and the like), polyacrylonitriles (PAN), polyamides (nylons, for example, nylon-6, nylon 6,6, nylon-6,12, and the like), cellulosics and glass.
7. The fibrous filtration media according to embodiment 1 wherein the media is essentially free of binder resin.
8. The fibrous filtration media according to embodiment 1, further comprising a mixture of synthetic staple fiber components comprised of a first type of synthetic fibers having an average diameter of between about 0 wt. % to about 60 wt. %, based on total weight of the fibrous web, and a second type of synthetic fibers having an average diameter of between about 0 wt. % to about 60 wt. %, based on total weight of the fibrous web.
9. The fibrous filtration media according to embodiment 8, wherein the first type of synthetic fibers have an average length of between about 1 mm to about 6 mm, and the second type of synthetic fibers have an average length of between about 5 mm to about 25 mm.
10. The fibrous filtration media according to embodiment 1, further comprising between about 0 wt. % to about 40 wt. %, typically between 0 wt. % to about 30 wt. %, based on total weight of the fibrous web, of regenerated cellulosic fibers.
11. The fibrous filtration media according to embodiment 10, wherein the regenerated cellulosic fibers comprise non-fibrillated lyocell fibers.
12. The fibrous filtration media according to embodiment 1, wherein the filtration media further comprises at least one additive selected from the group consisting of wet strength additives, optical brighteners, fiber retention agents, colorants, fuel-water separation aides, and flame or fire retardants.
13. The fibrous filtration media according to embodiment 1, wherein the fibrous web comprises bicomponent staple fibers and fibrillated lyocell fibers present in a weight ratio of bicomponent staple fibers to fibrillated lyocell fibers within a range of 0.5 to 3.
14. The fibrous filtration media according to embodiment 1, wherein the bicomponent staple fibers are sheath/core bicomponent staple fibers having a sheath comprised of polyethylene terephthalate (PET) with a melting temperature between about 120° C. to about 180° C.
15. The fibrous filtration media according to embodiment 14, wherein the core of the bicomponent staple fibers comprises PET having a melting temperature between about 220° C. to about 280° C.
16. A wire electronic discharge machine (EDM) which includes a filter unit comprising a fibrous filtration media according to embodiment 1.
17. A method of making a fibrous web comprising:
(a) forming a wet-laid fibrous web from an aqueous fibrous slurry comprised of about 20 wt. % to about 80 wt. %, based on total weight of the wet-laid fibrous web, sheath-core bicomponent staple fibers, and from about 10 wt. % to about 50 wt. %, based on total weight of the wet-laid fibrous web, fibrillated lyocell staple fibers; and
(b) subjecting the wet-laid sheet from step (a) to hot calendering to melt the sheath of the bicomponent staple fibers so as to bind the fibrillated lyocell staple fibers one to one another and achieve a fibrous filtration media having a wet burst strength of 3 bar or greater.
18. The method according to embodiment 17, wherein step (a) is practiced such that the bicomponent staple fibers and fibrillated lyocell fibers are present in a weight ratio of bicomponent staple fibers to fibrillated lyocell fibers within a range of 0.5 to 3.
19. The fibrous filtration media according to embodiment 1, wherein the bicomponent staple fibers are sheath/core bicomponent staple fibers having a sheath comprised of polyethylene terephthalate (PET) with a melting temperature between about 120° C. to about 180° C., and wherein the fibrillated lyocell staple fibers have a Canadian Standard Freeness (CSF) of about 100 mL or less.
20. A method to filter water during wire electron discharge machining (WEDM) which comprises passing water associated with the WEDM process through a fibrous filtration media according to embodiment 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:
1. A fibrous filtration media for filtering process fluids associated with electron discharge machining (EDM) comprising a wet-laid nonwoven fibrous web comprised of:
from about 20 wt. % to about 80 wt. %, based on total weight of the fibrous web, bicomponent staple fibers; and from about 10 wt. % to about 50 wt. %, based on total weight of the fibers in the media, fibrillated lyocell staple fibers, wherein
the fibrous web has a mean flow pore size of 20 μm or less, the fibrous web exhibits a wet burst strength of 3 bar or greater, and the media is free of binder resin.

2. The fibrous filtration media according to claim 1, wherein the fibrous web has a wet burst strength of from about 3 bar to about 6 bar.

3. The fibrous filtration media according to claim 1, wherein the fibrillated lyocell staple fibers have a Canadian Standard Freeness (CSF) of about 100 mL or less.

4. The fibrous filtration media according to claim 1, wherein the fibrous web has a mean flow pore size of 15 μm or less.

5. The fibrous filtration media according to claim 1, where the fibrous web has a maximum pore size of 25 μm or less.

6. The fibrous filtration media according to claim 1, where the fibrous web comprises at least one other fiber component comprised of fibers selected from the group consisting of polyesters (e.g., polyalkylene terephthalates such as polyethylene terephthalate (PET), polybutylene terephthalate (PBT) and the like), polyalkylenes (e.g., polyethylenes, polypropylenes and the like), poyacrylonitriles (PAN), polyamides (nylons, for example, nylon-6, nylon 6,6, nylon-6, 12, and the like), cellulosics and glass.

7. The fibrous filtration media according to claim 1, further comprising a mixture of synthetic staple fiber components comprised of between about 0 wt. % to about 60 wt. %, based on total weight of the fibrous web, of a first type of synthetic fibers having an average diameter of between about 2.5 μm to about 10 μm, and between about 0 wt. % to about 60 wt. %, based on total weight of the fibrous web, of a second type of synthetic fibers having an average diameter of between about 10 μm to about 20 μm.

8. The fibrous filtration media according to claim 7, wherein the first type of synthetic fibers have an average length of between about 1 mm to about 6 mm, and the second type of synthetic fibers have an average length of between about 5 mm to about 25 mm.

9. The fibrous filtration media according to claim 1, further comprising between about 0 wt. % to about 40 wt. % based on total weight of the fibrous web, of regenerated cellulosic fibers.

10. The fibrous filtration media according to claim 9, wherein the regenerated cellulosic fibers comprise non-fibrillated lyocell fibers.

11. The fibrous filtration media according to claim 1, wherein the filtration media further comprises at least one additive selected from the group consisting of wet strength additives, optical brighteners, fiber retention agents, colorants, fuel-water separation aides, and flame or fire retardants.

12. The fibrous filtration media according to claim 1, wherein the fibrous web comprises bicomponent staple fibers and fibrillated lyocell fibers present in a weight ratio of bicomponent staple fibers to fibrillated lyocell fibers within a range of 0.5 to 3.

13. The fibrous filtration media according to claim 1, wherein the bicomponent staple fibers are sheath/core bicomponent staple fibers having a sheath comprised of polyethylene terephthalate (PET) with a melting temperature between about 120° C. to about 180° C.

14. The fibrous filtration media according to claim 13, wherein the core of the bicomponent staple fibers comprises PET having a melting temperature between about 220° C. to about 280° C.

15. A wire electronic discharge machine (EDM) which includes a filter unit comprising a fibrous filtration media according to claim 1.

16. The fibrous filtration media according to claim 1, wherein the bicomponent staple fibers are sheath/core bicomponent staple fibers having a sheath comprised of polyethylene terephthalate (PET) with a melting temperature between about 120° C. to about 180° C., and wherein the fibrillated lyocell staple fibers have a Canadian Standard Freeness (CSF) of about 100 mL or less.

17. A method of making a fibrous web comprising:
(a) forming a wet-laid fibrous web from an aqueous fibrous slurry comprised of about 20 wt. % to about 80 wt. %, based on total weight of the wet-laid fibrous web, sheath-core bicomponent staple fibers, and from about 10 wt. % to about 50 wt. %, based on total weight of the wet-laid fibrous web, fibrillated lyocell staple fibers; and
(b) subjecting the wet-laid sheet from step (a) to hot calendering to melt the sheath of the bicomponent staple fibers so as to bind the fibrillated lyocell staple fibers one to one another and achieve a fibrous filtration media having a wet burst strength of 3 bar or greater and a mean flow pore size of 20 μm or less, wherein the media is free of binder resin.

18. The method according to claim 17, wherein step (a) is practiced such that the bicomponent staple fibers and fibrillated lyocell fibers are present in a weight ratio of bicomponent staple fibers to fibrillated lyocell fibers within a range of 0.5 to 3.

* * * * *